US012785407B2

(12) United States Patent
Brennan et al.

(10) Patent No.: US 12,785,407 B2
(45) Date of Patent: Nov. 3, 2026

(54) POWER OPTIMIZATION AMONG MULTIPLE STRINGS OF SOLAR PANELS

(71) Applicant: Sol-Ark, LLC, Allen, TX (US)

(72) Inventors: Thomas Joseph Brennan, Richardson, TX (US); Carlos Daniel Prieto, Allen, TX (US)

(73) Assignee: Sol-Ark, LLC, Allen, TX (US)

( * ) Notice: Subject to any disclaimer, the term of this patent is extended or adjusted under 35 U.S.C. 154(b) by 0 days.

(21) Appl. No.: 19/229,025

(22) Filed: Jun. 5, 2025

(65) Prior Publication Data

US 2025/0379448 A1 Dec. 11, 2025

Related U.S. Application Data

(60) Provisional application No. 63/658,357, filed on Jun. 10, 2024.

(51) Int. Cl.
*H02J 3/38* (2026.01)
*H02J 101/24* (2026.01)

(52) U.S. Cl.
CPC ........... *H02J 3/381* (2013.01); *H02J 2101/25* (2026.01)

(58) Field of Classification Search
CPC ...... H02J 3/38; H02J 3/381; H02J 3/40; H02J 3/44; H02J 3/46; H02J 3/466; H02J 3/50; H02J 2101/24; H02J 2101/25
USPC ........................................................... 307/84
See application file for complete search history.

(56) References Cited

U.S. PATENT DOCUMENTS

2013/0026839 A1* 1/2013 Grana ...................... H02J 1/10 307/71

* cited by examiner

*Primary Examiner* — Hal Kaplan
(74) *Attorney, Agent, or Firm* — Kilpatrick Townsend & Stockton LLP

(57) ABSTRACT

Examples described herein relate to energy management and power optimization. A maximum power point tracking (MPPT) unit is coupled with multiple strings of solar panels. Each string of solar panels includes multiple solar panels, and each solar panel is coupled with a power optimizer. The MPPT unit monitors the multiple strings of solar panels, detects a voltage decrease from a first voltage value to a second voltage value at a first string of solar panels among the multiple strings of solar panels, and transmits one or more signals to one or more power optimizers corresponding to one or more solar panels in a second string. The one or more signals cause the one or more power optimizers to regulate voltages at the one or more solar panels, so that a voltage at the second string of solar panels is substantially equal to the second voltage value.

20 Claims, 4 Drawing Sheets

POWER OPTIMIZATION AMONG MULTIPLE STRINGS OF SOLAR PANELS

CROSS-REFERENCES TO RELATED APPLICATIONS

This application claims priority to U.S. Provisional Patent Application No. 63/658,357, filed Jun. 10, 2024, entitled "POWER OPTIMIZATION AMONG MULTIPLE STRINGS OF SOLAR PANELS," which is hereby incorporated by reference in its entirety for all purposes.

BACKGROUND OF THE INVENTION

Photovoltaic (PV) or solar panels are commonly employed distributed energy resources (DERs) that convert light into electricity by using the PV effect. The performance of the solar panels is affected by sunlight incident on the solar panels. A microgrid system can include multiple strings of solar panels. Different irradiance or orientation of one or more solar panels in the same string can impact the voltage or current, compromising the power output of the entire string of solar panels. Maximum Power Point Tracking (MPPT) can manage voltages and currents at solar panels to achieve maximum power output.

Despite the progress made in the area of PV panels, there is a need in the art for improved methods and systems related to power optimization for strings of PV panels.

SUMMARY OF THE INVENTION

The present disclosure generally relates to methods and systems for power optimization among multiple strings of solar panels. More particularly, embodiments of the present invention relate to power optimization among multiple strings of solar panels connected to a single Maximum Power Point Tracking (MPPT) unit in a microgrid, such as a home energy grid. Embodiments of the present invention are also applicable beyond homes and may be employed in other residential, commercial, or industrial settings where multiple strings of solar panels may be installed to provide power supply to multiple loads.

Some examples described herein involve an energy management system that can include an MPPT unit coupled with multiple strings of solar panels. Each string includes multiple solar panels connected in series, and each solar panel is coupled to a power optimizer for power regulation. The MPPT unit can monitor the multiple strings of solar panels via current and voltage sensors at each string. If the voltages between different strings are not balanced (e.g., at the same level or substantially the same level), the MPPT unit can only extract power from the strings with highest voltages. In order to extract maximum power from the multiple strings controlled by the MPPT unit, the MPPT unit can maintain voltage balance between the multiple strings by commanding power optimizers to regulate voltages at certain solar panels. For example, when a voltage drop is detected at a first string due to shading of one of the solar panels, the MPPT unit can transmit a control signal to power optimizers coupled to solar panels in other strings to step down voltages at the corresponding solar panels by a fraction of the voltage drop at the first string. As a result, the voltages at the other strings will have the same voltage drop as the first string, and the voltages at the multiple strings are balanced for the MPPT unit to extract maximum power from the multiple strings of solar panels.

One embodiment of the present invention involves an energy management system that can include an MPPT unit coupled with multiple strings of solar panels. The MPPT unit is coupled with multiple strings of solar panels. Each string of solar panels may include multiple solar panels, and each solar panel is coupled with a power optimizer that is in communication with the MPPT unit and configured to regulate voltage and current at each solar panel. The MPPT unit is configured to monitor the multiple strings of solar panels, detect a voltage decrease from a first voltage value to a second voltage value at a first string of solar panels among the multiple strings of solar panels, and transmit one or more signals to one or more power optimizers corresponding to one or more solar panels in a second string. The one or more signals can cause the one or more power optimizers to regulate voltages at the one or more solar panels so that a voltage at the second string of solar panels is substantially equal to the second voltage value.

Another embodiment of the present invention includes a method executed by an MPPT unit coupled with multiple strings of solar panels. The method also includes monitoring multiple strings of solar panels. Each string of solar panels may include multiple solar panels, and each solar panel is coupled with a power optimizer that is in communication with the MPPT unit and configured to regulate voltage and current at each solar panel. The method also includes detecting a voltage decrease from a first voltage value to a second voltage value at a first string of solar panels among the multiple strings of solar panels. The method also includes transmitting one or more signals to one or more power optimizers corresponding to one or more solar panels in a second string. The one or more signals can cause the one or more power optimizers to regulate voltages at the one or more solar panels so that a voltage at the second string of solar panels is substantially equal to the second voltage value.

Yet another embodiment of the present invention includes a non-transitory computer-readable medium. The non-transitory computer-readable medium can include processor-executable instructions configured to cause one or more processors to monitor multiple strings of solar panels, detect a voltage decrease from a first voltage value to a second voltage value at a first string of solar panels among the multiple strings of solar panels, and transmit one or more signals to one or more power optimizers corresponding to one or more solar panels in a second string. Each string of solar panels may include multiple solar panels, and each solar panel is coupled with a power optimizer that is in communication with an MPPT unit and configured to regulate voltage and current at each solar panel. The one or more signals are configured to cause the one or more power optimizers to regulate voltages at the one or more solar panels so that a voltage at the second string of solar panels is substantially equal to the second voltage value.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION OF SPECIFIC EMBODIMENTS

Figure 1:
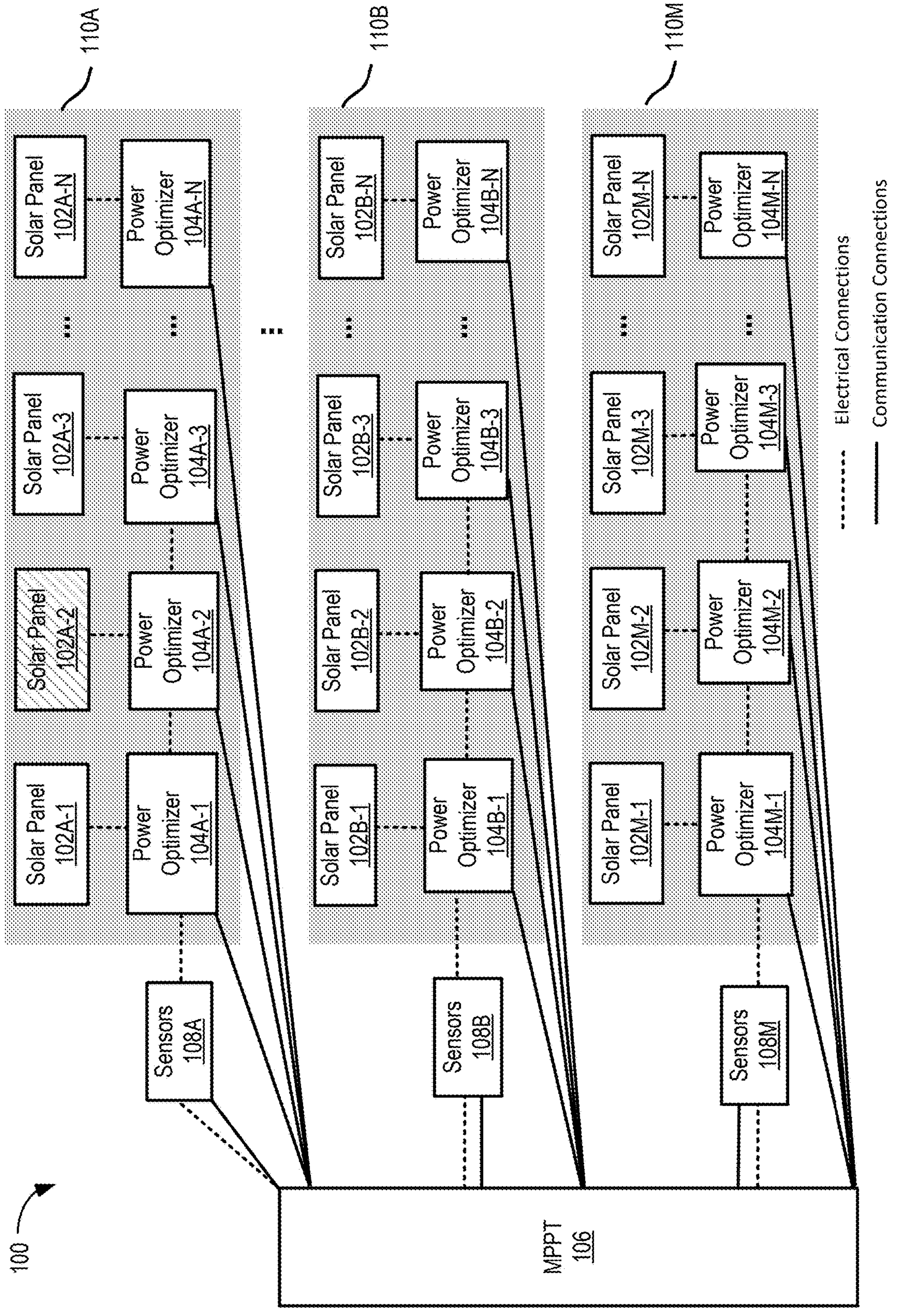
FIG. 1 illustrates a block diagram of an example of an energy management system for a solar array according to some aspects of the present disclosure.

The present disclosure relates generally to methods and systems for managing energy output by a solar array. More particularly, embodiments of the present invention provide power optimization among multiple strings of solar panels coupled to the same MPPT unit. Each string includes multiple solar panels connected in series, and each solar panel is coupled to a power optimizer for power regulation. The MPPT unit can monitor the multiple strings of solar panels via current and voltage sensors at each string. If the voltages between different strings are not balanced (e.g., at the same level or substantially the same level), the MPPT unit can only extract power from the strings with highest voltages. In order to extract maximum power from the multiple strings controlled by the MPPT unit, the MPPT unit can maintain voltage balance between the multiple strings by commanding power optimizers to regulate voltages at certain solar panels. For example, when a voltage drop is detected at an abnormal string (e.g., a string that is not operating normally because of shading or another issue), the MPPT unit can transmit a control signal to power optimizers coupled to solar panels in other strings to step down voltages at the corresponding solar panels by a fraction of the voltage drop at abnormal string. So that the voltages at the other strings have the same voltage drop as the abnormal string, and the voltages at the multiple strings are balanced for the MPPT unit to extract maximum power from the multiple strings of solar panels.

Many factors can lead to a performance discrepancy among different solar panels. Examples of such factors can include shading, debris, variable roof geometry, mismatched PV module orientation, snow load, unequal PV module lifetime degradation, etc. Each solar panel can be coupled with a power optimizer for panel-level monitoring and power optimization. For example, the power optimizer can include a buck converter to step down the output voltage and increase the output current of an underperforming solar panel to provide granular MPPT correction and ensure optimum string current is delivered.

Multiple solar panels can be connected in series in a string to provide energy to a distribution grid or microgrid. There may be multiple strings of solar panels connected in parallel. Typically, every string of solar panels has its own dedicated MPPT unit before connecting to an inverter. However, one large MPPT unit can work with multiple strings to reduce power loss, simplify wire connections, and reduce costs.

When shading happens on a solar panel in a string, the current drops for that one string. The power optimizer for that solar panel can buck down the voltage and boost the current back to the normal level. The overall optimized string has the maximum current with some drop in voltage from shaded panels. This method works well with dedicated MPPTs for each string. However, when there are two or more strings connected to one MPPT unit, and one string has a decreased voltage due to shading effect or other reasons, the MPPT unit could only optimize the strings with higher voltages. As a result, the string with shaded panels may stop working. Thus, in such a scenario, the MPPT unit may not extract the maximum power from all the solar panels.

The present disclosure provides an energy management system that can control the voltage output at different strings of solar panels to be substantially equal (e.g., e.g., equal to or within a small tolerance of, such as within 1% of each other), so that the MPPT unit can extract maximum power from all the strings connected to the MPPT unit. For example, a single MPPT unit can be coupled to two or more strings of solar panels, where the two or more strings of solar panels are in parallel to one another. Each string of solar panels can include two or more solar panels connected in series. Each solar panel is coupled with a power optimizer. The power optimizer is in wired or wireless communication with the MPPT unit. The MPPT unit includes a transmitter that can generate and transmit a "permission to operate" signal to each power optimizer at a predetermined time interval. Each power optimizer receives the signal, which can activate the power optimizer to operate.

In the above example, a solar panel in the first string may have a current drop and a voltage drop due to shading (e.g., from a tree branch). The current drop can be detected by the power optimizer directly or by the MPPT unit via current sensing. The power optimizer at the shaded panel can automatically respond by bucking down the voltage and boosting the current back to the previous level using a buck converter. The overall voltage at the first string thus has a drop compared to the other strings. To resolve this discrepancy, the MPPT unit can transmit signals to the power optimizers for the solar panels in the other strings to cause them to regulate the voltages at corresponding solar panels, so that the overall voltages at the other strings are substantially equal to the voltage at the first string. For example, if there are three strings with ten solar panels each, and if the voltage drop at the first string is 10 volts (V), the voltage drop at each of the ten solar panels in the second string can be 1 V, and the voltage drop at each of the ten solar panels in the third string can also be 1 V. This allows all three strings to maintain the same string voltage so that the MPPT can extract the maximum power from the three strings.

Accordingly, various aspects of the present disclosure can enable power optimization among multiple strings of solar panels with one MPPT unit. The MPPT unit can communicate with power optimizers coupled with solar panels to trigger the power optimizers to regulate voltages and currents, so as to maintain balance between the multiple strings connected to the MPPT unit. This may help facilitate maximum power extraction from all the strings of the solar panels, while reducing power loss and cost using just one MPPT unit.

FIG. 1 illustrates a block diagram 100 of an example of an energy management system for a solar array according to some aspects of the present disclosure. In FIG. 1, the solar array includes M (e.g., 3) strings of solar panels 110A, 110B, . . . , 110M, which may be referred to herein individually as string 110 or collectively as strings 110. The M strings of solar panels is monitored and controlled by one MPPT unit 106. The MPPT unit 106 can collect voltage and current measurements from sensors at each string, for example sensors 108A at string 110A, sensors 108B at string 110B, and sensors 108M at string 110M, which may be referred to herein individually as sensors 108 or collectively as sensor 108. The electrical connections and the communications connections shown in FIG. 1 are for illustration purposes only, and are not intended to be limiting. There may be other electrical and communication connections between the components of FIG. 1 that are excluded for simplicity. Conversely, certain connections in FIG. 1 may not be needed in other embodiments.

Each string of solar panels includes N (e.g., 10) solar panels. For example, string 110A includes solar panels 102A-1, 102A-2, . . . , 102A-N, string 110B includes solar panels 102B-1, 102B-2, . . . , 102B-N, and string 110M includes solar panels 102M-1, 102M-2, . . . , 102M-N, which may be referred to herein individually as a solar panel 102 or collectively as the solar panels 102. Each solar panel 102 is coupled with a power optimizer, for example optimizer 104A-1 is coupled with solar panel 102A-1, and optimizer 104M-N is coupled with solar panel 102M-N, which may be referred to herein individually as a power optimizer 104 or collectively as the power optimizers 104. The power optimizer 104 can include a buck converter for regulating current and voltage at the corresponding solar panel 102. The power optimizer 104 can also include current and voltage sensors for measurements.

The power optimizers 104 for corresponding solar panels 102 in a string 110 are in communication with MPPT unit 106. The communication can be via powerline communication, wireless communication (e.g., Bluetooth, IEEE 802.11, or radio communications), networked communications, or other suitable communication protocols. The MPPT unit 106 can transmit activation signals to the power optimizers 104 at predetermined time intervals (e.g., every second) or upon detecting a triggering event, so that the power optimizers can operate in response to current or voltage changes at corresponding solar panels. The MPPT unit 106 can also transmit commands to certain power optimizers for maintaining voltage balances between the M strings to extract maximum power for the M strings. For example, a solar panel 102A-2 suddenly has a current drop and voltage drop (e.g., due to shading effect from tree branches, dust, or other objects), the corresponding power optimizer 104A-2 can operate to boost the current back to or close to the normal level by bucking down the voltage at solar panel 102A-2. The MPPT unit 106 detects a voltage drop at string 110A and transmits commands to power optimizers coupled to solar panels in string 110B and other strings controlled by MPPT unit 106, so that the voltage at each string can be balanced for extracting maximum power from all the solar panels.

Figure 2:
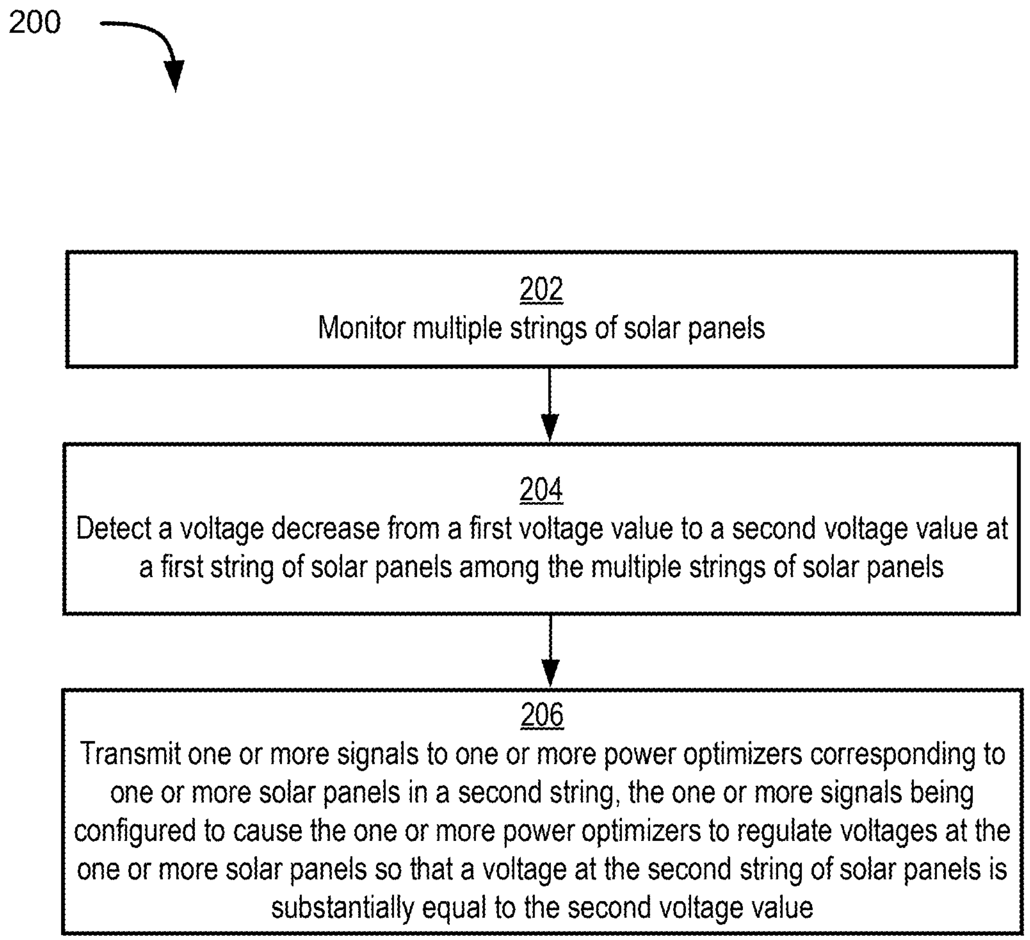
FIG. 2 illustrates a flowchart of an example of a process performed by an energy management system for the solar array of FIG. 1 for power optimization according to some aspects of the present disclosure.

FIG. 2 illustrates a flowchart 200 of an example of a process performed by an energy management system for the solar array of FIG. 1 for power optimization according to some aspects of the present disclosure. At block 202, an MPPT unit 106 monitors multiple strings 110 of solar panels. The multiple strings 110 of solar panels are connected in parallel to the MPPT unit 106. Each string 110 of solar panels includes multiple solar panels 102 connected in series. Each solar panel 102 is coupled with a power optimizer 104. At least some of the solar panels 102 can be manufactured with identical specifications, in terms of nominal operating cell temperature, temperature coefficient, maximum power point, maximum power point voltage, maximum power point current, open circuit voltage, short circuit current, module efficiency, etc. Alternatively, or additionally, some solar panels may have different specifications compared to other solar panels. In some examples, the strings can each include the same number of solar panels as one another. Alternatively, some strings can include different numbers of solar panels as compared to other strings. The MPPT unit 106 can receive current measurements and voltage measurements from sensors 108, for example current sensors and voltage sensors, to track current and voltage at each string of solar panels. In some examples, the current sensors and voltage sensors are integrated into the MPPT unit 106. In some examples, the current sensors and voltage sensors are not part of the MPPT unit 106, but rather are separate components from the MPPT unit 106. In some examples, the power optimizer 104 coupled with each solar panel 102 implements or use a current sensor and voltage sensor to measure the current and voltage at each solar panel 102 and transmit to the MPPT unit 106. The current sensor and voltage sensor can be integrated with the power optimizer 104 or can be separate components from the power optimizer 104.

At block 204, the MPPT unit 106 detects a voltage decrease from a first voltage value to a second voltage value at a first string of solar panels among the multiple strings of solar panels. In some examples, one or more solar panels in the first string are partially covered by shade or object (e.g., dust, debris, snow). Alternatively, or additionally, one or more solar panels may change to a mis-matched orientation compared to other solar panels. Alternatively, or additionally, one or more solar panels may become more degraded over time (e.g., and thus have a higher degradation level than other solar panels). These condition changes may cause a current decrease in the one or more solar panels. In some examples, a power optimizer 104 at a solar panel 102 of the first string of solar panels can detect the current decrease at the solar panel 102 and transmit information about the current decrease to the MPPT unit 106. For example, if solar panel 102A-2 is shaded, the power optimizer 104A-2 can detect a current decrease at solar panel 102A-2 via a current sensor.

Figure 3:
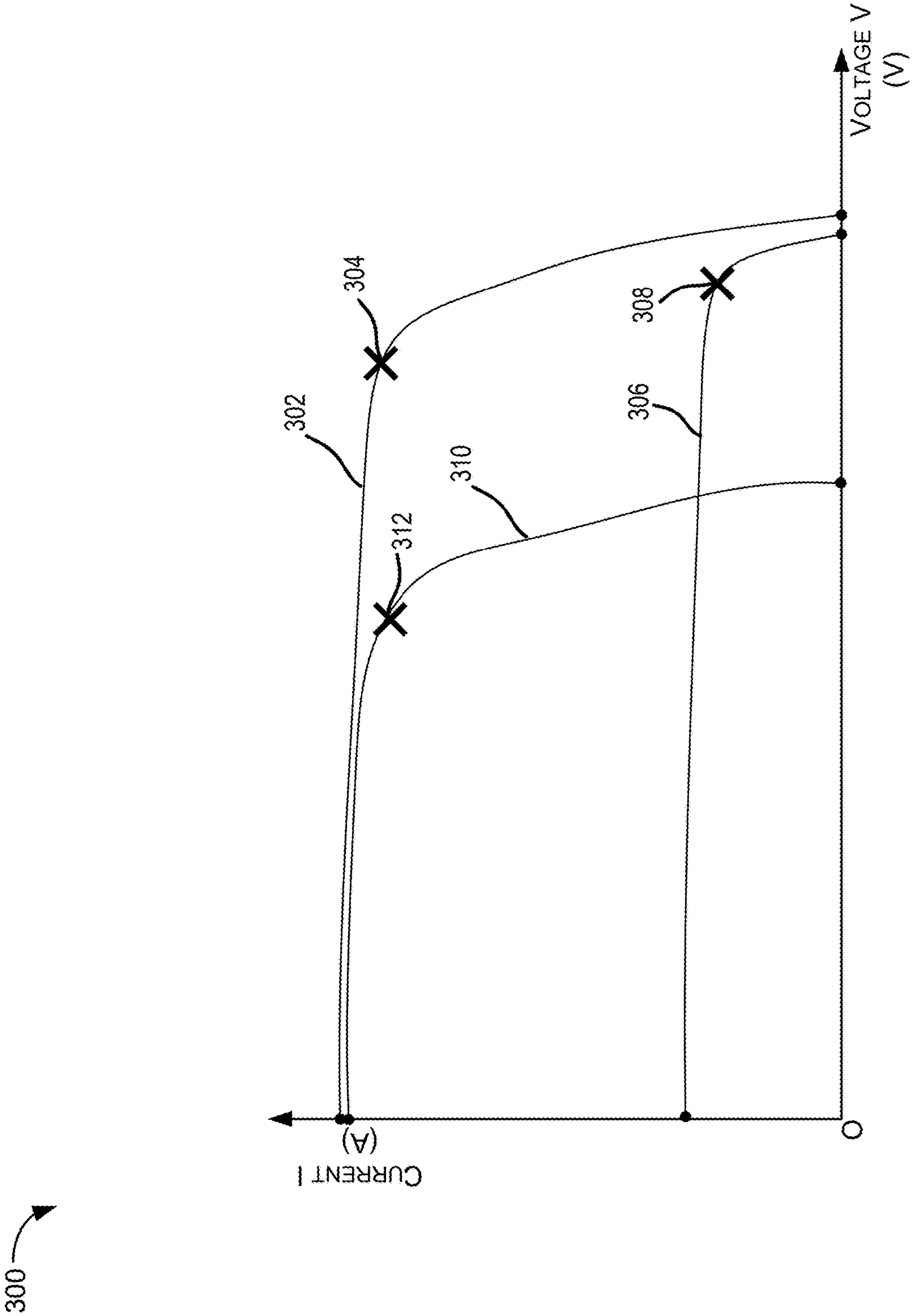
FIG. 3 illustrates a comparison of I-V curves for a solar panel in the solar array of FIG. 1 under different conditions according to some aspects of the present disclosure.

In some examples, the MPPT unit 106 includes a transmitter to generate and transmit activation signals to the power optimizers 104 coupled with the solar panels 102 at predetermined time intervals (e.g., every second). The activation signal activates the power optimizers 104 to operate. Without receiving the activation signal, the power optimizers 104 may not operate, for example to reduce power consumption. In some examples, each power optimizer coupled with each solar panel in the first string of solar panels may be configured to activate, either automatically or in response to an activation signal from the MPPT unit 106, to respond to the current decrease. In this way, power optimizers coupled with abnormal solar panels outputting decreased current can operate to regulate the voltage and current at each abnormal solar panel. For example, if solar panel 102A-2 in string 110A is covered by shade, the current generated by the shaded solar panel 102A-2 can decrease significantly while the voltage of the shaded solar panel 102A-2 decreases slightly. The power optimizer 104A-2 coupled with the shaded solar panel 102A-2 can be automatically activated to step down the voltage and boost the current, for example using a buck converter. As a result, the current can become substantially equal to the current right before the shading. Thus, the normal (e.g., unshaded) solar panels in the string 110A maintain their original maximum power points, while shaded solar panel 102A-2 operates in its modified maximum power point. The MPPT 106 unit can detect the voltage decrease at string 110A via the power optimizers 104A coupled with the solar panels 102A in string 110A, and/or the MPPT 106 unit can detect the voltage decrease at string 110A via sensors 108A at string 110A. FIG. 3 shows an example of the changes in current, voltage, and maximum power point of a solar panel in different situations.

Because of the current regulation by the power optimizer at abnormal solar panels (e.g., shaded solar panel 102A-2), the voltages at the abnormal solar panels are decreased, so the overall voltage at the first string of solar panels is also decreased. A voltage sensor at the first string of solar panels can measure the voltage and transmit the voltage measurement to the MPPT unit 106.

At block 206, the MPPT unit 106 transmits one or more signals to one or more power optimizers corresponding to one or more solar panels in a second string. The one or more signals can cause the one or more power optimizers to regulate voltages at the one or more solar panels so that a voltage at the second string of solar panels is substantially equal to (e.g., equal to or within a small tolerance of) the second voltage value. Thus, to extract the maximum amount of power from all strings of solar panels, the MPPT unit 106 can trigger the power optimizers coupled with solar panels in other strings of solar panels to regulate the voltages of corresponding solar panels. The MPPT unit 106 can determine a voltage difference between the second voltage value and the first voltage value, determine how to apportion the voltage difference among the one or more solar panels of the second string, such that each respective solar panel of the one or more solar panels is assigned a respective portion of the voltage difference. The MPPT unit 106 then transmits a respective signal to each respective power optimizer corresponding to each respective solar panel of the one or more solar panels. The respective signal can cause the respective power optimizer to reduce a respective output voltage of the respective solar panel by the respective portion of the voltage difference assigned to the respective solar panel. For example, at block 204, the voltage at string 110A can be dropped to 240 V from 250 V because of one shaded solar panel 102A-2. The MPPT unit 106 can enable the power optimizers in the other strings of solar panels to regulate the voltage of corresponding solar panels so that the voltages at the other strings are also 240 V. If there are ten solar panels in the second string 110B, the MPPT unit 106 can send commands to all ten power optimizers to regulate the voltage at each solar panel from 25 V to 24 V. Thus, the ten solar panels of the string 110B share the voltage change caused by one solar panel 102A-2 in string 110A, with each solar panel having a slight voltage change (e.g., 1V). In some examples, the MPPT unit 106 sends commands to a subset of power optimizers coupled with the second string to regulate the voltage at the corresponding solar panels. The subset of power optimizers can be designated or randomly selected. For example, five of the ten optimizers are activated to regulate the voltages at corresponding five solar panels in string 110B, the voltage at each of the five solar panels changes by 2 V, decreasing from 25 V to 23 V. The MPPT unit 106 can determine how to apportion the desired voltage change among one or more of the power optimizers on the second string 110B and then communicate with those power optimizers to implement that voltage change.

FIG. 3 illustrates a comparison 300 of I-V curves (current-voltage curves, where "I" stands for current and "V" stands for voltage) for a solar panel in the solar array of FIG. 1 under different conditions according to some aspects of the present disclosure. Curve 302 is an I-V curve when the solar panel is unshaded. The maximum power point is at point 304. When the solar panel is suddenly shaded and before the corresponding power optimizer and the MPPT unit can intervene, the I-V curve of the shaded solar panel is curve 306, and the maximum power point at point 308. It can be seen that the current dropped significantly between these two curves, with a small voltage change at point 308 as compared to point 304. When the corresponding power optimizer is activated to boost the current from the solar panel to be equal to or close to the current before shading, by bucking down the voltage, the I-V curve of the shaded solar panel after optimization becomes curve 310, with the maximum power point at point 312. As can be seen in FIG. 3, at point 312, the current is almost the same as the current before shading, but the voltage is decreased noticeably compared to the voltage at point 304 before shading.

Figure 4:
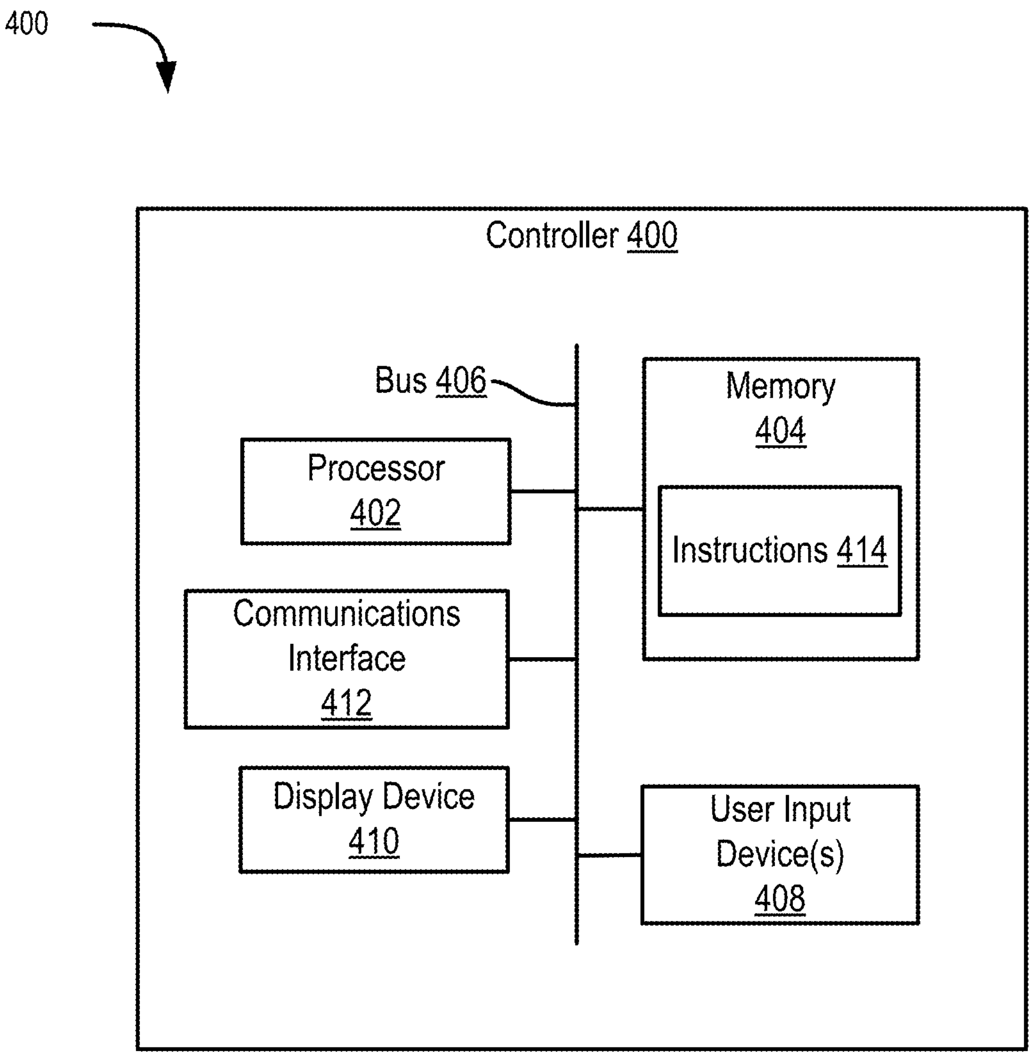
FIG. 4 is a block diagram illustrating a computing device according to some aspects of the present disclosure.

FIG. 4 is a block diagram illustrating a computing device according to some aspects of the present disclosure. The computing device 400 can be usable to implement some aspects of the present disclosure is shown. In some examples, the computing device 400 may correspond to a computing component of MPPT unit 106 in FIG. 1 that can execute some or all of the process shown in FIG. 2.

The computing device 400 includes a processor 402 that is in communication with the memory 404 and other components of the computing device 400 using one or more communications buses 406. The processor 402 is hardware that can include one processing device or multiple processing devices. Examples of the processor 402 can include a Field-Programmable Gate Array (FPGA), an application-specific integrated circuit (ASIC), or a microprocessor. The processor 402 is configured to execute processor-executable instructions 414 stored in the memory 404 to perform one or more processes described herein. The instructions 414 may include processor-specific instructions generated by a compiler or an interpreter from code written in any suitable computer-programming language, such as C, C++, C #, Java, or Python.

The memory 404 is hardware that can include one memory device or multiple memory devices. The memory 404 can be volatile or non-volatile (it can retain stored information when powered off). Examples of the memory 404 include electrically erasable and programmable read-only memory (EEPROM), flash memory, or cache memory. At least some of the memory 404 includes a non-transitory computer-readable medium from which the processor 402 can read instructions 414. A computer-readable medium can include electronic, optical, magnetic, or other storage devices capable of providing the processor 402 with the instructions 414 or other program code. Examples of a computer-readable mediums include magnetic disks, memory chips, ROM, random-access memory (RAM), an ASIC, a configured processor, and optical storage.

The computing device 400 may include one or more user input devices 408 (e.g., a keyboard, mouse, touchscreen, video capture device, and/or microphone) to accept user input and the display device 410 to provide visual output to a user.

The computing device 400 may further include a communications interface 412. In some examples, the communications interface 412 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While examples and features of disclosed principles are described herein, modifications, adaptations, and other implementations are possible without departing from the spirit and scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein, the singular forms “a,” “an,” and “the” include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. An energy management system comprising:

a maximum power point tracking (MPPT) unit coupled with multiple strings of solar panels, wherein each string of solar panels comprises multiple solar panels, and each solar panel is coupled with a power optimizer that is in communication with the MPPT unit and configured to regulate voltage and current at each solar panel, wherein the MPPT unit is configured to:

monitor the multiple strings of solar panels;

detect a voltage decrease from a first voltage value to a second voltage value at a first string of solar panels among the multiple strings of solar panels; and transmit one or more signals to one or more power optimizers corresponding to one or more solar panels in a second string, the one or more signals being configured to cause the one or more power optimizers to regulate voltages at the one or more solar panels so that a voltage at the second string of solar panels is substantially equal to the second voltage value.

2. The energy management system of claim 1, wherein the voltage decrease is caused by a condition at a solar panel in the first string of solar panels, wherein a power optimizer corresponding to the solar panel is configured to:

detect a current decrease from a first current value at the solar panel; and regulate the voltage and the current at the solar panel so that a current at the solar panel is substantially equal to the first current value.

3. The energy management system of claim 2, wherein the condition involves the solar panel being covered by shade or object, having a mis-matched orientation compared to other solar panels, or having a higher degradation level than other solar panels.

4. The energy management system of claim 1, wherein the power optimizer comprises a buck converter configured to step down an output voltage of a solar panel and step up an output current of the solar panel.

5. The energy management system of claim 1, wherein each string of solar panels is coupled with a current sensor and a voltage sensor, wherein the current sensor is configured to measure the current from the string of solar panels and transmit the measured current to the MPPT unit, and wherein the voltage sensor is configured to measure the voltage at the string of solar panels and transmit the measured voltage to the MPPT unit.

6. The energy management system of claim 1, wherein the MPPT unit comprises a transmitter configured to transmit an activation signal to each power optimizer coupled with each solar panel at a predetermined time interval, wherein each power optimizer is configured to receive the activation signal, wherein the activation signal comprises a message to activate a power optimizer.

7. The energy management system of claim 1, wherein the MPPT is configured to:

determine a voltage difference between the second voltage value and the first voltage value;

determine how to apportion the voltage difference among the one or more solar panels of the second string, such that each respective solar panel of the one or more solar panels is assigned a respective portion of the voltage difference; and transmit a respective signal to each respective power optimizer corresponding to each respective solar panel of the one or more solar panels, the respective signal being configured to cause the respective power optimizer to reduce a respective output voltage of the respective solar panel by the respective portion of the voltage difference assigned to the respective solar panel.

8. A method comprising:

monitoring, by a maximum power point tracking (MPPT) unit, multiple strings of solar panels, wherein each string of solar panels comprises multiple solar panels, and each solar panel is coupled with a power optimizer that is in communication with the MPPT unit and configured to regulate voltage and current at each solar panel;

detecting, by the MPPT unit, a voltage decrease from a first voltage value to a second voltage value at a first string of solar panels among the multiple strings of solar panels; and transmitting, by the MPPT unit, one or more signals to one or more power optimizers corresponding to one or more solar panels in a second string, the one or more signals being configured to cause the one or more power optimizers to regulate voltages at the one or more solar panels so that a voltage at the second string of solar panels is substantially equal to the second voltage value.

9. The method of claim 8, wherein the voltage decrease is caused by a condition at a solar panel in the first string of solar panels, wherein a power optimizer corresponding to the solar panel is configured to:

detect a current decrease from a first current value at the solar panel; and regulate the voltage and the current at the solar panel so that a current at the solar panel is substantially equal to the first current value.

10. The method of claim 9, wherein the condition involves the solar panel being covered by shade or object, having a mis-matched orientation compared to other solar panels, or having a higher degradation level than other solar panels.

11. The method of claim 8, wherein the power optimizer comprises a buck converter configured to step down an output voltage of a solar panel and step up an output current of the solar panel.

12. The method of claim 8, further comprising:

receiving, by the MPPT unit, current measurements from multiple current sensors at the multiple strings of solar panels; and receiving, by the MPPT unit, voltage measurements from multiple voltage sensors at the multiple strings of solar panels.

13. The method of claim 8, further comprising:

transmitting, by the MPPT unit, an activation signal to each power optimizer coupled with each solar panel at a predetermined time interval.

14. The method of claim 8, further comprising:

determining, by the MPPT unit, a voltage difference between the second voltage value and the first voltage value;

determining, by the MPPT unit, how to apportion the voltage difference among the one or more solar panels of the second string, such that each respective solar panel of the one or more solar panels is assigned a respective portion of the voltage difference; and transmitting, by the MPPT unit, a respective signal to each respective power optimizer corresponding to each respective solar panel of the one or more solar panels, the respective signal being configured to cause the respective power optimizer to reduce a respective output voltage of the respective solar panel by the respective portion of the voltage difference assigned to the respective solar panel.

15. A non-transitory computer-readable medium comprising program code that is executable by one or more processors for causing the one or more processors to:

monitor multiple strings of solar panels, wherein each string of solar panels comprises multiple solar panels, and each solar panel is coupled with a power optimizer that is in communication with a maximum power point tracking (MPPT) unit and configured to regulate voltage and current at each solar panel;

detect a voltage decrease from a first voltage value to a second voltage value at a first string of solar panels among the multiple strings of solar panels; and transmit one or more signals to one or more power optimizers corresponding to one or more solar panels in a second string, the one or more signals being configured to cause the one or more power optimizers to regulate voltages at the one or more solar panels so that a voltage at the second string of solar panels is substantially equal to the second voltage value.

16. The non-transitory computer-readable medium of claim 15, wherein the power optimizer comprises a buck converter configured to step down an output voltage of a corresponding solar panel and step up an output current of the corresponding solar panel.

17. The non-transitory computer-readable medium of claim 15, further comprising program code that is executable by the one or more processors to:

receive current measurements from multiple current sensors at the multiple strings of solar panels; and receive voltage measurements from multiple voltage sensors at the multiple strings of solar panels.

18. The non-transitory computer-readable medium of claim 15, further comprising program code that is executable by the one or more processors to:

transmit an activation signal to each power optimizer coupled with each solar panel at a predetermined time interval.

19. The non-transitory computer-readable medium of claim 15, further comprising program code that is executable by the one or more processors to:

determine a voltage difference between the second voltage value and the first voltage value;

determine how to apportion the voltage difference among the one or more solar panels of the second string, such that each respective solar panel of the one or more solar panels is assigned a respective portion of the voltage difference; and transmit a respective signal to each respective power optimizer corresponding to each respective solar panel of the one or more solar panels, the respective signal being configured to cause the respective power optimizer to reduce a respective output voltage of the respective solar panel by the respective portion of the voltage difference assigned to the respective solar panel.

20. The non-transitory computer-readable medium of claim 15, wherein the voltage decrease is caused by a condition at a solar panel in the first string of solar panels, the condition involving the solar panel being partially covered by shade or object, having a mis-matched orientation compared to other solar panels, or having a higher degradation level than other solar panels; and wherein a power optimizer corresponding to the solar panel is configured to:

detect a current decrease from a first current value at the solar panel; and regulate the voltage and the current at the solar panel so that a current at the solar panel is substantially equal to the first current value.

* * * * *